(12) United States Patent
Adachi et al.

(10) Patent No.: US 11,057,952 B2
(45) Date of Patent: Jul. 6, 2021

(54) RADIO TERMINAL AND NETWORK APPARATUS

(71) Applicant: KYOCERA Corporation, Kyoto (JP)

(72) Inventors: Hiroyuki Adachi, Kawasaki (JP); Kugo Morita, Yokohama (JP); Masato Fujishiro, Yokohama (JP); Mayumi Komura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 210 days.

(21) Appl. No.: 16/364,223

(22) Filed: Mar. 26, 2019

(65) Prior Publication Data

US 2019/0223239 A1    Jul. 18, 2019

Related U.S. Application Data

(63) Continuation of application No. PCT/JP2017/032976, filed on Sep. 13, 2017.

(30) Foreign Application Priority Data

Sep. 30, 2016 (JP) .............................. JP2016-194383

(51) Int. Cl.
*H04L 1/00* (2006.01)
*H04W 76/14* (2018.01)
(Continued)

(52) U.S. Cl.
CPC ........... *H04W 76/14* (2018.02); *H04W 88/04* (2013.01); *H04W 92/18* (2013.01); *H04W 64/00* (2013.01); *H04W 76/34* (2018.02)

(58) Field of Classification Search
None
See application file for complete search history.

(56) References Cited

U.S. PATENT DOCUMENTS 10,285,207 B2 * 5/2019 Lee ..................... H04M 3/58
10,531,365 B2 * 1/2020 Kaur .................... H04W 24/04
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, (Release 13), 3GPP TS 36.300 V13.4.0, Jun. 2016, pp. 1-310, Valbonne, France.
(Continued)

*Primary Examiner* — Bob A Phunkulh
(74) *Attorney, Agent, or Firm* — Studebaker & Brackett PC

(57) ABSTRACT

A radio terminal according to one embodiment is configured to perform a relay between another radio terminal and a network. The radio terminal comprises: a transmitter configured to notify the network of first information indicating that the radio terminal is a relay terminal of the another radio terminal; a controller configured to forward data addressed to the another radio terminal to the another radio terminal via a connection between the another radio terminal through the radio terminal and the network; and a receiver configured to receive from the network a message indicating that the data addressed to the another radio terminal exists when at least part of the connection is released. The controller is configured to start control for establishing the connection in order to forward the data addressed to the another radio terminal in response to receiving the message.

13 Claims, 10 Drawing Sheets

(51) Int. Cl.
H04W 92/18 (2009.01)
H04W 88/04 (2009.01)
H04W 64/00 (2009.01)
H04W 76/34 (2018.01)

(56) References Cited

U.S. PATENT DOCUMENTS

| | | | | |
|---|---|---|---|---|
| 2008/0002741 | A1* | 1/2008 | Maheshwari | H04W 68/02 370/473 |
| 2008/0040507 | A1* | 2/2008 | Hsu | H04L 45/34 709/238 |
| 2012/0039246 | A1* | 2/2012 | Zhang | H04W 68/02 370/315 |
| 2012/0315903 | A1* | 12/2012 | Yoshimura | H04W 60/04 455/435.1 |
| 2013/0337813 | A1* | 12/2013 | Van Phan | H04W 36/08 455/436 |
| 2015/0063199 | A1* | 3/2015 | Wang | H04W 8/06 370/315 |
| 2015/0382159 | A1* | 12/2015 | Kim | H04W 4/80 370/312 |
| 2016/0198516 | A1* | 7/2016 | Kim | H04L 12/189 370/312 |
| 2016/0205653 | A1* | 7/2016 | Kim | H04B 17/318 455/456.5 |
| 2016/0295494 | A1* | 10/2016 | Gulati | H04B 7/15507 |
| 2017/0244469 | A1* | 8/2017 | Seo | H04B 7/15507 |
| 2018/0091964 | A1* | 3/2018 | Adachi | H04W 8/00 |
| 2018/0092017 | A1* | 3/2018 | Freda | H04W 36/36 |
| 2018/0109985 | A1* | 4/2018 | Huang | H04W 76/23 |
| 2018/0110094 | A1* | 4/2018 | Fukuta | H04W 88/04 |
| 2018/0124633 | A1* | 5/2018 | Hwang | H04W 28/02 |
| 2018/0192280 | A1* | 7/2018 | Kuge | H04W 12/06 |
| 2018/0234942 | A1* | 8/2018 | Kim | H04W 68/02 |
| 2018/0249516 | A1* | 8/2018 | Jung | H04W 76/14 |
| 2018/0295497 | A1* | 10/2018 | Kim | H04W 60/04 |
| 2018/0295534 | A1* | 10/2018 | Huang | H04L 43/16 |
| 2019/0007827 | A1* | 1/2019 | Huang | H04W 4/00 |

OTHER PUBLICATIONS

ZTE, Considerations on the evolved UE-to-Network Relay scenario and architecture, 3GPP TSG-RAN WG2, Meeting #95, R2-165254, Aug. 22-26, 2016, pp. 1-6, Göteborg, Sweden.

* cited by examiner

RADIO TERMINAL AND NETWORK APPARATUS

CROSS-REFERENCE TO RELATED APPLICATION

The present application is a continuation based on PCT Application No. PCT/JP2017/032976 filed on Sep. 13, 2017, which claims the benefit of Japanese Patent Application No. 2016-194383 (filed on Sep. 30, 2016). The content of which are incorporated by reference herein in their entirety.

TECHNICAL FIELD

The present disclosure relates to a radio terminal and a network apparatus.

BACKGROUND ART

In 3GPP (3rd Generation Partnership Project), which is a standardization project of mobile communication system, the specification of the proximity services (ProSe: Proximity-based Services) are being determined (see Non-Patent Literature 1).

In ProSe, a specific radio terminal (ProSe UE-to-Network Relay) can relay traffic between another radio terminal (Remote UE) and the network.

CITATION LIST

Non Patent Literature

Non Patent Literature 1: 3GPP technical specification "TS 36.300 V13.4.0" Jul. 7, 2016

SUMMARY

A radio terminal according to one embodiment is configured to perform a relay between another radio terminal and a network. The radio terminal comprises: a transmitter configured to notify the network of first information indicating that the radio terminal is a relay terminal of the another radio terminal; a controller configured to forward data addressed to the another radio terminal to the another radio terminal via a connection between the another radio terminal through the radio terminal and the network; and a receiver configured to receive from the network a message indicating that the data addressed to the another radio terminal exists when at least part of the connection is released. The controller is configured to start control for establishing the connection in order to forward the data addressed to the another radio terminal in response to receiving the message.

A network apparatus comprises a controller. The controller is configured to receive first information indicating that a first radio terminal is a relay terminal of a second radio terminal, transmit data addressed to the second radio terminal to the second radio terminal via a connection between the second radio terminal through the first radio terminal and the network apparatus, and notify the first radio terminal of a message indicating that data addressed to the second radio terminal exists based on the first information when at least part of the connection is released.

DESCRIPTION OF EMBODIMENTS

Overview of Embodiments

Figure 1:
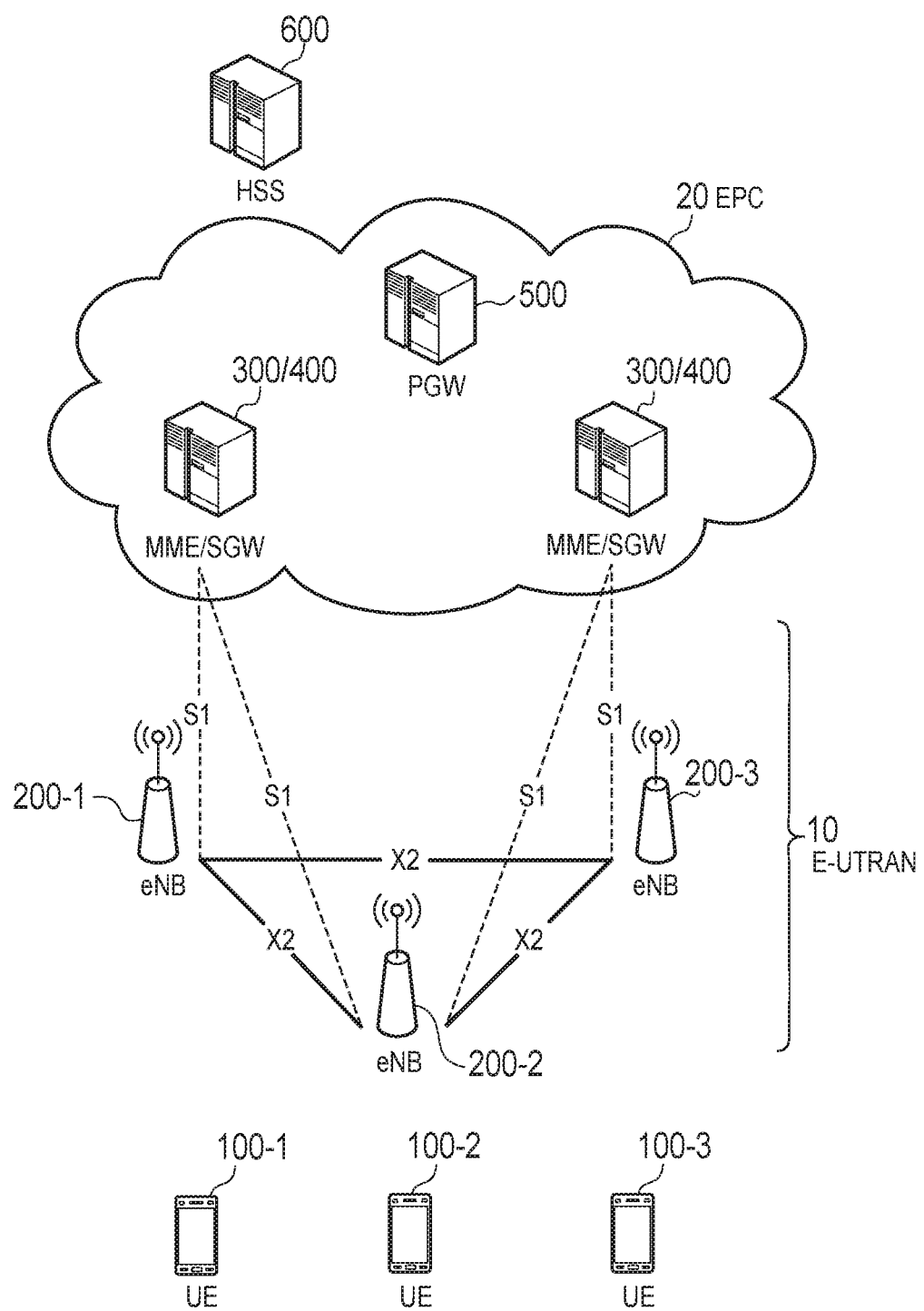
FIG. 1 is a diagram showing a configuration of an LTE system.

It is discussed that a radio terminal relays data of a wearable terminal (Wearable UE), which is a radio terminal that a user can wear, by proximity services. It is assumed that after a connection is established between the wearable terminal and the network via the relay terminal, the data of the wearable terminal is transmitted via the connection.

However, there is a problem that data of the wearable terminal can not be transmitted, for example, when a part of the connection is disconnected by the transition of the relay terminal to the RRC idle state.

A radio terminal according to one embodiment is configured to perform a relay between another radio terminal and a network. The radio terminal comprises: a transmitter configured to notify the network of first information indicating that the radio terminal is a relay terminal of the another radio terminal; a controller configured to forward data addressed to the another radio terminal to the another radio terminal via a connection between the another radio terminal through the radio terminal and the network; and a receiver configured to receive from the network a message indicating that the data addressed to the another radio terminal exists when at least part of the connection is released. The controller is configured to start control for establishing the connection in order to forward the data addressed to the another radio terminal in response to receiving the message.

The controller may be configured to establish the connection by establishing a connection between the radio terminal and the another radio terminal.

The controller may be configured to establish the connection by establishing a connection between the radio terminal and the network.

The receiver may be configured to receive a paging message as the message when a connection between the radio terminal and the network is released.

The transmitter may be configured to notify the network of second information for deleting from the network that the radio terminal is a relay terminal of the another radio terminal.

The transmitter may be configured to notify the network of the second information in response to a fact that a relay to the another radio terminal is unnecessary.

The transmitter may be configured to notify the network of the second information in response to a fact that communication with the another radio terminal is impossible.

The controller may be configured to update a location of the another radio terminal registered in the network instead of the another radio terminal according to a change in a location of the radio terminal.

The transmitter may be configured to transmit, to the another radio terminal, a notification for updating a location of the another radio terminal registered in the network according to a change in a location of the radio terminal.

The controller may be configured to determine that the location of the radio terminal has been changed according to an update of a location of the radio terminal registered in the network.

The controller may be configured to determine that the location of the radio terminal has been changed according to a change in a selection cell.

A network apparatus comprises a controller. The controller is configured to receive first information indicating that a first radio terminal is a relay terminal of a second radio terminal, transmit data addressed to the second radio terminal to the second radio terminal via a connection between the second radio terminal through the first radio terminal and the network apparatus, and notify the first radio terminal of a message indicating that data addressed to the second radio terminal exists based on the first information when at least part of the connection is released.

EMBODIMENTS

Mobile Communication System

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (radio terminal). The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" may be used as a term indicating the minimum unit of a radio communication area. The "cell" may be used as a term indicating a function of performing radio communication with the UE 100.

The EPC 20 corresponds to a core network. The EPC 20 may constitute a network together with the E-UTRAN 10.

The EPC 20 includes an MME (Mobility Management Entity) 300, an SGW (Serving Gateway) 400 and a PGW 500.

The MME 300 performs, for example, various kinds of mobility control for the UE 100. The SGW 400 performs, for example, data transfer control. The MME 300 and the SGW 400 are connected to the eNB 200 via a 51 interface. The PGW (Packet Data Network Gateway) 500 performs control to relay user data from an external network (and to an external network).

The LTE system may comprise an HSS (Home Subscriber Server) 600. The HSS 600 manages user information. The HSS 600 handles, for example, service control and subscriber data. The HSS 600 communicates with the MME 300.

Figure 2:
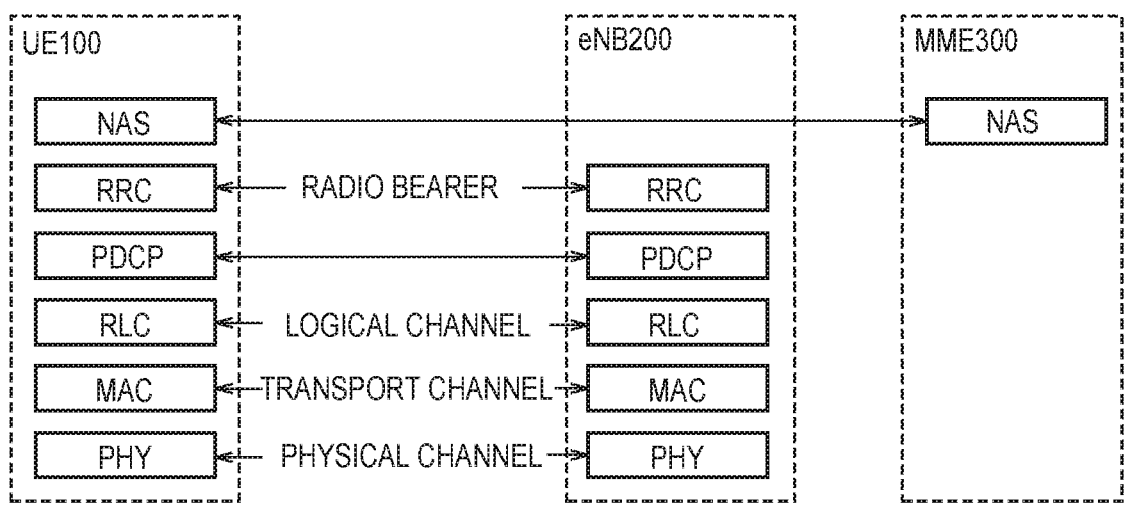
FIG. 2 is a protocol stack diagram of a radio interface in an LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
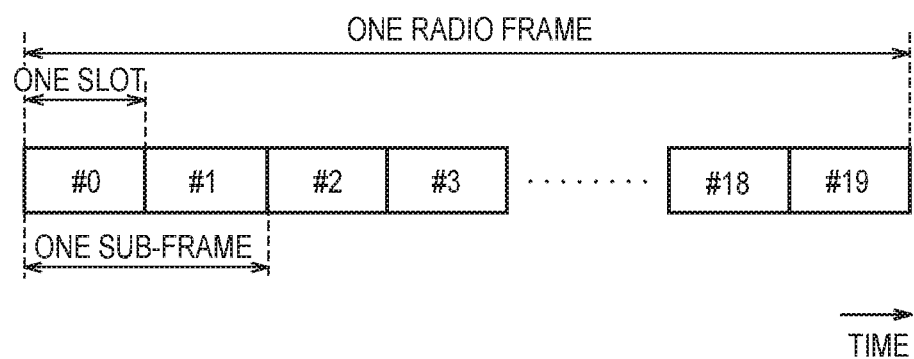
FIG. 3 is a configuration diagram of a radio frame used in an LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

Proximity-Based Service

Proximity-based services (ProSes) will be described. The proximity-based service is a service that can be provided by a 3GPP system, based on communication devices (for example, UEs 100) in the vicinity of each other.

In the ProSe, various types of radio signals are transmitted and received via a direct radio link between nodes (for example, between UEs), without passing through the eNB 200. The direct radio link in ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface (PC5 connection). The PC5 is a reference point between ProSe usable UEs (ProSe-enabled UE) used for a control plane and a user plane for the ProSe direct discovery, the ProSe direct communication, and a ProSe UE-to-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. The direct discovery is a procedure for discovering another UE in the vicinity of the UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only a capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is connected to the cell (eNB 200) or exists in the cell.

A resource allocation type for the transmission (announcement) of the discovery message (discovery signal) includes "Type 1" and "Type 2 (Type 2B)". In "Type 1", the UE 100 selects a radio resource. In "Type 2 (Type 2B)", the eNB 200 allocates a radio resource. In Type 1, the UE 100 may select a radio resource from resource pools provided by the eNB 200.

A "Sidelink Direct Discovery" protocol stack includes a physical (PHY) layer, a MAC layer, and the ProSe protocol. Between the physical layer of a UE (A) and the physical layer of a UE (B), a discovery signal is transmitted via a physical channel called a physical sidelink discovery channel (PSYCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). The direct communication is communication between two or more UEs capable of executing the proximity-based services through user plane transmission in which the E-UTRA technology is used via a path without passing through any network node.

A resource allocation type of the direct communication includes "Mode 1" and "Mode 2". In "Mode 1", the eNB 200 assigns a radio resource of the direct communication. In "Mode 2", the UE 100 selects a radio resource of the direct communication. In Mode 2, the UE 100 may select a radio resource from the resource pools provided by the eNB 200.

A direct communication protocol stack includes a physical (PHY) layer, a MAC layer, an RLC layer, and a PDCP layer. Between the physical layer of the UE (A) and the physical layer of the UE (B), a control signal is transmitted via a physical sidelink control channel (PSCCH), and data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

Relay Using Proximity-Based Service

Figure 4:
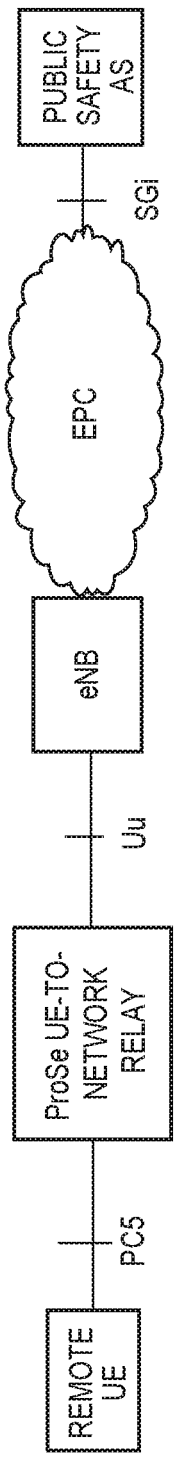
FIG. 4 is a diagram for explaining a relay using proximity services.

A relay using the proximity-based service (ProSe relay/ProSe UE-to-network relay) will be described with reference to FIG. 4. FIG. 4 is a diagram for describing the relay using the proximity-based service according to the embodiment.

In FIG. 4, a remote UE (Remote UE) is a UE 100 that communicates with a PDN (Packet Data Network) via a relay UE (ProSe UE-to-Network Relay). The remote UE may be a UE for public safety (ProSe-enabled Public Safety UE).

The "ProSe-enabled Public Safety UE" is configured such that an HPLMN (Home Public Land Mobile Network) is authorised for use for public safety. The "ProSe-enabled Public Safety UE" can utilize the proximity-based services, and supports the procedures in the proximity-based services as well as a specific capability for public safety. For example, the "ProSe-enabled Public Safety UE" transmits information for public safety through the proximity-based services. The information for public safety includes, for example, information on a disaster (such as an earthquake and a fire) and information used by a fire official or a police official.

The remote UE may be a UE that is located outside the network area (Out-of-Network). That is, the remote UE may be located outside a coverage of the cell. The remote UE may be located within the coverage of the cell. Therefore, the remote UE may be a UE 100 to which a service is not directly provided by the E-UTRAN 10 (UE 100 which is not served by the E-UTRAN 10). The remote UE is provided with a ProSe relay service from the relay UE, as described later. A relay is executed between the remote UE that is provided with the ProSe relay service and the relay UE that provides the ProSe relay service.

The relay UE (ProSe UE-to-Network Relay) provides functions to support connectivity of "Unicast" services for the remote UE. Therefore, the relay UE provides the ProSe relay service for the remote UE. Therefore, the relay UE can relay data (unicast traffic) between the remote UE and the network. The relay UE can relay data (traffic) of the remote UE through the proximity-based services (direct communication). Specifically, the relay UE can relay data (uplink traffic) received from the remote UE via the PC5 interface to the eNB 200 via a Uu interface (LTE-Uu) or a Un interface (LTE-Un). The relay UE can relay data (downlink traffic) received from the eNB 200 via the Uu interface or the Un interface to the remote UE via the PC5 interface. The relay UE may be located only within the network (within the coverage of the cell).

The relay UE can provide a comprehensive function capable of relaying any type of traffic related to the communication for public safety.

The relay UE and the remote UE can transmit data and control signals between the physical layers. Similarly, the relay UE and the remote UE can transmit data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. The relay UE and the remote UE can transmit data and control signals between the IP-Relay layer and the IP layer. The relay UE is able to transmit data between the IP-Relay layer and the IP layer of an IP-GW 350.

In an AS layer (Access Stratum), the relay UE can transmit data (traffic) to the remote UE by broadcast. In the AS layer, the relay UE may transmit data to the remote UE by unicast. If the ProSe relay service is executed by broadcast, a feedback in the NAS layer (Non Access Stratum) may be performed between the relay UE and the remote UE, but a feedback in the AS layer is not performed. If the ProSe UE-to-Network relay is executed by unicast, the feedback in the AS layer may be performed.

Radio Terminal

Figure 5:
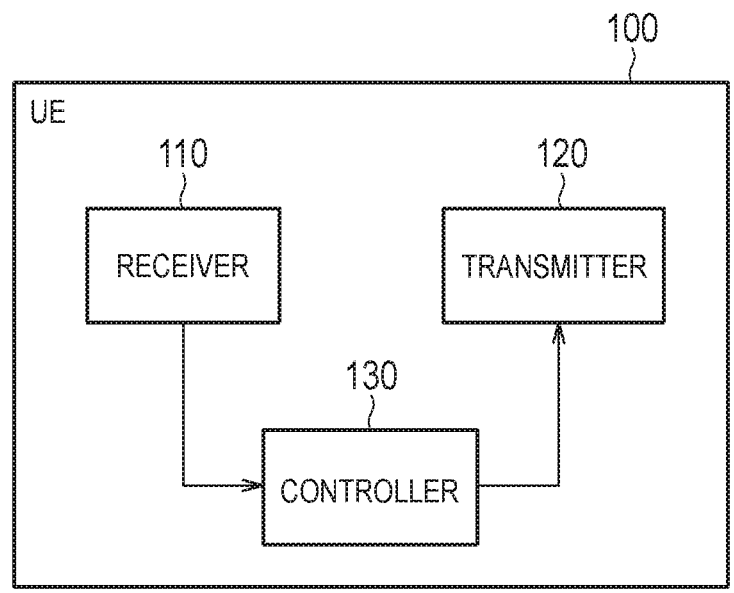
FIG. 5 is a block diagram of a UE 100.

The UE 100 (radio terminal/wearable terminal) according to the embodiment will be described. FIG. 5 is a block diagram of the UE 100. As illustrated in FIG. 5, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

Base Station

Figure 6:
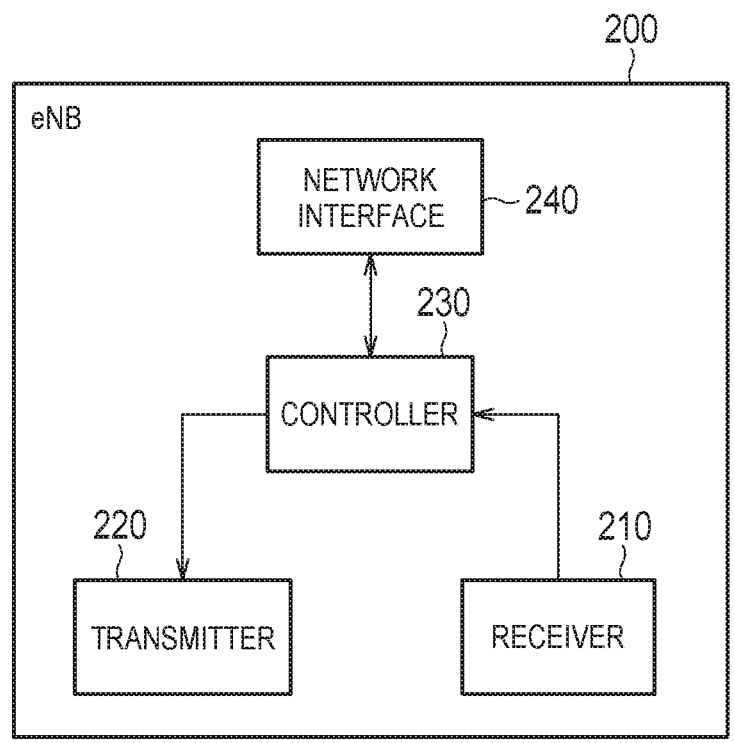
FIG. 6 is a block diagram of the eNB 200.

The eNB 200 (base station) according to the embodiment will be described. FIG. 6 is a block diagram of the eNB 200. As illustrated in FIG. 6, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example. The network interface 240 is used for communication with the HSS 600.

For simplicity, a process executed by at least any one of the transmitter 210, the receiver 220, the controller 230, and the network interface 240 included in the eNB 200 is described herein as a process (operation) executed by the eNB 200.

Network Apparatus

A network apparatus (NW apparatus) according to the embodiment will be described. As an example, the MME 300 will be described.

Figure 7:
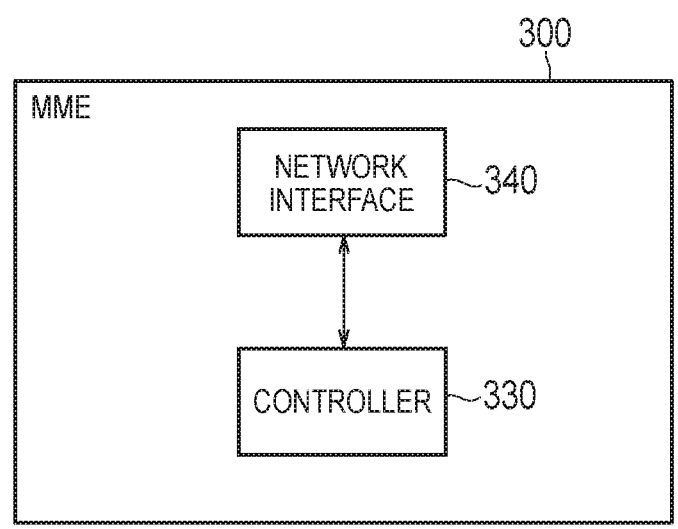
FIG. 7 is a block diagram of the MME 300.

FIG. 7 is a block diagram of the MME 300. As illustrated in FIG. 7, the MME 300 includes a controller (control unit) 330 and a network interface 340.

The controller 330 performs various controls in the MME 300. The controller 330 includes a processor and a memory. The memory stores programs executed by the processor and information used for processing by the processor. The processor includes a baseband processor and a CPU. The baseband processor performs modulation/demodulation, encoding/decoding, etc. of the baseband signal and the like. The CPU executes various processes by executing a program stored in the memory. The processor executes various processes to be described later and various communication protocols described above.

A network interface 340 is connected to another node (eNB 200 and/or another network apparatus) via a predetermined interface. The network interface 340 is used for communication with another network apparatus to be performed on a predetermined interface.

Since the other NW devices have the same configuration as the MME 300, the description thereof will be omitted. In the present specification, the process executed by at least one of the controller and the network interface of the NW device will be described as a process (operation) executed by the NW device for the sake of convenience.

Operation According to Embodiment

Next, the operation according to the embodiment will be described with Operation Examples 1 to 4.

(A) Operation Example 1

Figure 8:
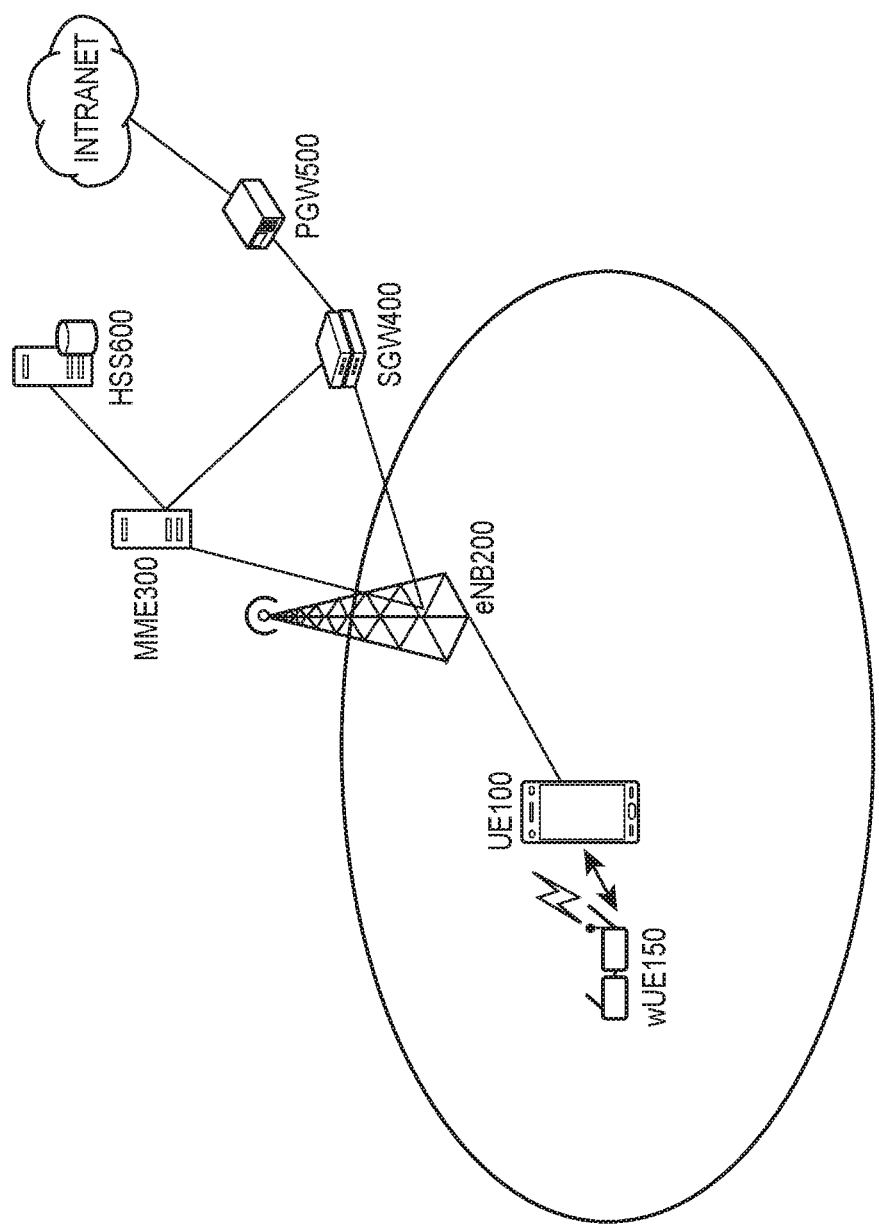
FIG. 8 is a diagram for explaining an operating environment.
Figure 9:
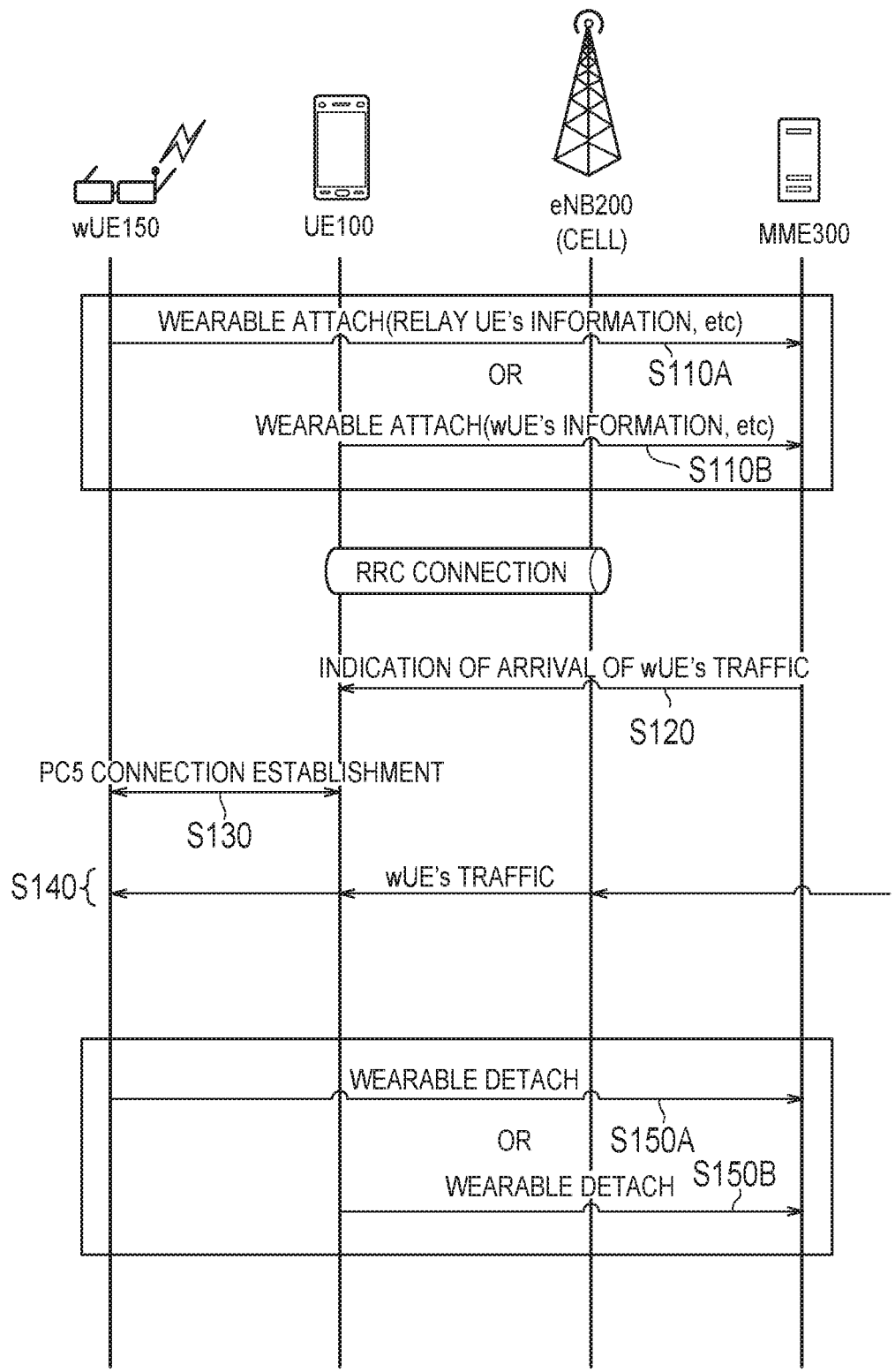
FIG. 9 is a sequence diagram for explaining Operation Example 1.

Operation Example 1 will be described with reference to FIGS. 8 and 9. FIG. 8 is a diagram for explaining the operating environment. FIG. 9 is a sequence diagram for explaining Operation Example 1.

As shown in FIG. 8, the UE 100 is located in a cell controlled by an eNB 200. The UE 100 may be in an RRC connection state with the eNB 200 (cell). The UE 100 may be in the RRC idle state.

The UE 100 (a receiver 110, a transmitter 120, and a controller 130 that it comprises) can perform cellular communication (transmission of an uplink signal and reception of a downlink signal) and a side link operation (transmission and/or reception of a side link signal). The side link signal may be at least one of a signal in direct communication and a signal in direct discovery. The side link signal may include a sidelink synchronization signal (SLSS) for synchronization in the side link. The side link signal may be the PC 5 signal used for a control plane signal on the PC 5.

The wUE 150 is located in a cell controlled by the eNB 200. The wUE 150 may be located outside the cell. The wUE 150 is in the RRC idle state with the eNB 200 (cell).

The wUE 150 (the receiver 110, the transmitter 120, and the controller 130 that it comprises) can be used to perform the side link operation. The wUE 150 can perform a downlink signal reception. The wUE 150 may be capable of performing the transmission of an uplink signal or may be incapable of performing. Accordingly, the wUE 150 may not include the transmitter 120 that transmits the uplink signal.

In the present embodiment, the wUE 150 is a wearable UE. That is, the wUE 150 is a communication device that the user can wear. Since the UE 100 and the wUE 150 are held by the user, the UE 100 and the wUE 150 are in a short distance state. As the user moves, the UE 100 and the wUE 150 move together while maintaining the short distance state.

The wUE 150 may be a short distance device. The wUE 150 may be a communication device whose side link operation is assumed to be performed at a short distance (within a range of several meters (for example, 2 m)).

In the present specification, the "short distance" may be defined as a communicable distance (for example, a range of several meters). For example, the maximum reachable distance (maximum reachable range) of the side link signal between short distance devices (between the UE and the wUE/between the wUE and the wUE) is shorter than the maximum reachable distance of the side link signal between normal UEs (between the UE and the UE). Naturally, the maximum reachable distance of the side link signal between the short distance devices is shorter than the maximum reachable distance of the uplink signal between the UE and the eNB.

"Short distance" may be defined by (maximum) transmission power of the side link signal (for example, maximum transmission power is 0 dBm or less). For example, the maximum transmission power of the side link signal between short distance devices (between the UE and the wUE/between the wUE and the wUE) is smaller than the maximum transmission power of the side link signal between normal UEs (between the UE and the UE). Naturally, the maximum transmission power of the side link signal between the short distance devices is smaller than the maximum transmission power of the uplink signal between the UE and the eNB.

"Short distance" may be defined by (the condition/setting) of the resource pool available to the wUE 150.

Unlike the existing the UE 100, the wUE 150 may not need to mount an existing SIM (Subscriber Identity Module Card). The wUE 150 may mount a short distance SIM (D2D SIM).

In FIG. 9, a connection for a relay (hereinafter referred to as a relay connection) is established between the wUE 150 and the network. The relay connection may be a connection between the wUE 150 and the eNB 200. The relay connection may be an RRC connection between the wUE 150 and the eNB 200. The relay connection may be a connection between the wUE 150 and the MME 300.

The connection between the UE 100 and the wUE 150 may be a connection via the PC 5 interface (PC 5 connection). The connection between the UE 100 and the wUE 150 may be a connection based on non-3 GPP access. In this case, data is transmitted between the UE 100 and the wUE 150 according to the specification of the non-3 GPP. The connection between the UE 100 and the eNB 200 may be an RRC connection. A relay connection through the UE 100 may be established between the wUE 150 and the network by means of a connection between the UE 100 and the wUE 150 and a connection between the UE 100 and the eNB 200.

The UE 100 and the wUE 150 may exchange or transmit/receive information included in the later-described Wearable Attach information when establishing the relay connection, or after establishing the relay connection.

As shown in FIG. 9, in step S110A, the wUE 150 may notify the network of information (Wearable Attach information) indicating that the UE 100 is a relay UE (relay terminal) of the wUE 150. For example, the wUE 150 notifies the MME 300 of the Wearable Attach information via the relay connection. The wUE 150 may transmit the Wearable Attach information to the UE 100 and the UE 100 may notify the MME 300 of the Wearable Attach information. Alternatively, the wUE 150 may directly notify the MME 300 of the Wearable Attach information. That is, the UE 100 may transmit the Wearable Attach information from the wUE 150 to the MME 300 without recognizing the Wearable Attach information.

The wUE 150 may notify the network of the Wearable Attach information in response to the establishment of the relay connection. The wUE 150 may notify the HSS 600 or another network apparatus (for example, a network apparatus that manages a relay by proximity services) of the Wearable Attach information.

The Wearable Attach information includes information (Relay UE's information) of UE 100 that is a relay UE. The Wearable Attach information includes an identifier of the UE 100 (for example, Relay ID, ProSe ID, Destination ID, Destination Index, IMEI (International Mobile Equipment Identity), IMSI (International Mobile Subscriber Identity), IP address, MAC address and the like). The ProSe ID is an identifier assigned to the UE 100 by the network apparatus that manages the ProSe. The Destination ID (Destination Index) is an identifier indicating the transmission destination (that is, the UE 100) of the wUE 150. The Wearable Attach information may include an identifier of the wUE 150 that is a remote UE.

The Wearable Attach information may include information indicating that the wUE 150 can receive the UE terminated service (data/packet) addressed to the wUE 150 through the relay UE. The network may perform the operation described below only when the information is received.

In step S110B, the UE 100 may notify the network of the Wearable Attach information.

The Wearable Attach information includes information (wUE's information) of the wUE 150 that is a remote UE. The Wearable Attach information may include an identifier (for example, ProSe ID, Destination ID, Destination Index, IMEI, IMSI, IP address, MAC address, etc.) of the wUE 150.

The Destination ID is an identifier indicating the transmission destination (that is, the UE 100) of the wUE 150. The Destination ID is an identifier indicating the transmission destination (that is, the wUE 150) of the UE 100. The Wearable Attach information may include an identifier of the UE 100 that is a relay UE.

The Wearable Attach information may include information indicating that the UE 100 is can forward (relay) the UE terminated service (data/packet) addressed to the wUE 150. The network may perform the operation described below only when the information is received.

At least one of the process of step S110A and the process of step S110B may be performed.

The MME 300 may store the relationship between the relay UE and the remote UE based on the Wearable Attach information. The MME 300 may store that the relay UE of the wUE 150 is the UE 100. The MME 300 may maintain a list of relationships between the relay UE and the remote UE. The MME 300 may update the list based on the Wearable Attach information. The MME 300 may forward the Wearable Attach information to the HSS 600. The HSS 600 may store the relationship between the relay UE and the remote UE. The MME 300 may forward the Wearable Attach information to the network apparatus that manages the relay by the proximity services. The network apparatus may store the relationship between the relay UE and the remote UE.

Thereafter, it is assumed that the connection between the UE 100 and the wUE 150 has been released. It is assumed that the RRC connection between the UE 100 and the eNB 200 is maintained. As a result, part of the relay connection is released.

Even when the connection between the UE 100 and the wUE 150 is released, the MME 300 (or the HSS 600 or the like) holds information (list) on the relationship between the relay UE and the remote UE.

In step S120, the MME 300 transmits, to the UE 100, a message (indication of arrival of wUE's traffic) indicating that the data addressed to the wUE 150 exists (has arrived). The MME 300 may transmit the message to the UE 100 in response to being informed by the SGW 400 that the data addressed to the wUE 150 has arrived.

Based on the list, the MME 300 can identify the UE 100 that is the relay UE of the wUE 150. That is, the MME 300 can identify the UE 100 that is the destination of the message. The MME 300 may transmit a message inquiring about the relay UE of the wUE 150 to the HSS 600 (or a network apparatus). The MME 300 may identify the UE 100 based on the response message (the identifier of the UE 100 included in the response message) from the HSS 600 (or the network apparatus).

The message may be a message for prompting the establishment of the relay connection. The message may be a message for prompting the establishment of the connection between the UE 100 and the wUE 150. The message may be a message for prompting the transmission of data addressed to the wUE 150. The message may be a message to indicating that the direct data transmission from the eNB 200 to the wUE 150 is not performed, but the indirect data transmission via the relay connection is performed.

The UE 100 receives a message from the network (the MME 300) when part of the relay connection is released.

In step S130, the UE 100 starts control for establishing a connection between the UE 100 and the wUE 150 in response to receiving the message. The UE 100 (re-)establishes a relay connection between the wUE 150 and the network by establishing a connection between the UE 100 and the wUE 150.

The UE 100 may transmit a message from the eNB 200 to the wUE 150. The UE 100 may forward a message (RRC message) from the eNB 200 to between the wUE 150 and the eNB 200 via the RRC connection. The UE 100 may forward, via the PC 5 connection, a PC 5 message including a message from the eNB 200. The wUE 150 can grasp that the data is transmitted through the relay connection by the message from the eNB 200 even when the wUE 150 is located within the coverage of the cell. When the wUE 150 is in the extended coverage, it must monitor the repeated transmission (Repetition) from the eNB 200 (network). Therefore, the wUE 150 can omit the monitor of the repeated transmission (Repetition) by the message from the eNB 200. As a result, the load of the wUE 150 can be reduced.

In step S140, data addressed to the wUE 150 (wUE's traffic) is transmitted from the network to the wUE 150 via a relay connection. Specifically, the UE 100 receives data addressed to the wUE 150 from the network via the relay connection, and forwards the data to the wUE 150.

Conventionally, when the connection between the UE 100 and the wUE 150 is released, relaying is impossible, so that it is assumed that the relationship between the UE 100 and the wUE 150 stored on the network is discarded. Therefore, even if the data addressed to the wUE 150 arrives at the SGW 400 (or the PGW 500), it was impossible to notify the wUE 150 that the data addressed to the wUE 150 exists.

According to Operation Example 1, even when the connection between the UE 100 and the wUE 150 is released, the message from the network causes the UE 100 to start control for establishing the connection between the UE 100 and the wUE 150. Thus, since the relay connection is (re-)established, the wUE 150 can receive the data.

Since the wUE 150 is a wearable UE, it is highly likely that the wUE 150 is in the vicinity of a specific UE 100 (such as a mobile phone) held by a user wearing the wearable UE. Therefore, even if the relay connection is (temporarily) released, the relay connection can be (re-)established immediately for the UE terminated service transmission.

In step S150A, the wUE 150 may notify the network of information (Wearable Detach information) for deleting (releasing) from the network that the UE 100 is a relay UE of the wUE 150. The wUE 150 may notify the network (the MME 300, the HSS 600, etc.) the Wearable Detach information in response to the fact that transmission of the UE terminated service is unnecessary. For example, the wUE 150 may notify the network of the Wearable Detach information in response to the start of the operation of turning off the power.

The Wearable Detach information may be information for deleting (releasing) the relationship between the relay UE and the remote UE stored in the network. The Wearable Detach information may include an identifier of the UE 100. The Wearable Detach information may include an identifier of the wUE 150.

In step S150B, the UE 100 may notify the network of the Wearable Detach information.

The UE 100 may notify the network of the Wearable Detach information in response to the fact that the relay to the wUE 150 is unnecessary. The UE 100 may notify the network of the Wearable Detach information in response to terminating the transmission of the UE terminated service. The UE 100 may notify the network of the Wearable Detach information in response to receiving from the wUE 150 information indicating that transmission of the UE terminated service is not required.

The UE 100 may notify the network of Wearable Detach information when the wUE 150 is deemed to be away from the UE 100. For example, the UE 100 may notify the network of the Wearable Detach information in response to the disabling of communication with the wUE 150. The UE 100 may notify the network of the Wearable Detach information in response to the unintentional disconnection of the connection between the UE 100 and the wUE 150.

At least one of the process of step S150A and the process of step S150B may be performed.

In response to receiving the Wearable Detach information, the network (the MME 300, the HSS 600, the network apparatus) may delete (release) the relationship between the UE 100 and the wUE 150. In response to receiving the Wearable Detach information, the network may update the list in order to delete the relationship between the UE 100 and the wUE 150.

The network may delete the relationship between the UE 100 and the wUE 150 in response to the elapse of a predetermined period of time since storing the relationship between the UE 100 and the wUE 150. The network may measure a predetermined period of time using a timer for measuring a predetermined period of time. The network may notify the UE 100 and/or the wUE 150 of deleting the relationship between the UE 100 and the wUE 150 before or after a predetermined period of time elapses. The UE 100 and/or the wUE 150 may again notify the network of the Wearable Attach information based on the notification.

(B) Operation Example 2

Figure 10:
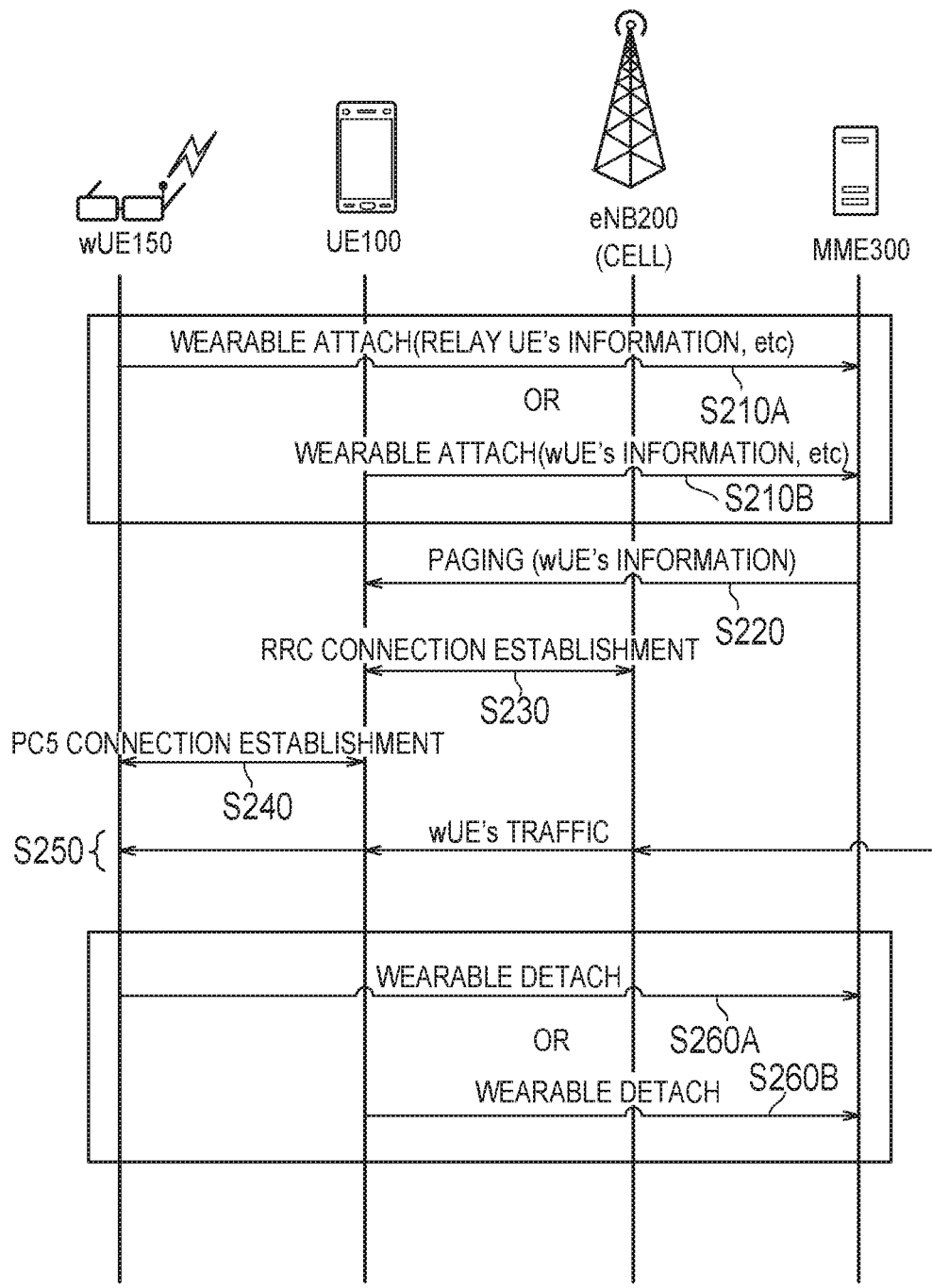
FIG. 10 is a sequence diagram for explaining Operation Example 2.

Operation Example 2 will be described with reference to FIG. 10. FIG. 10 is a sequence diagram for explaining Operation Example 2. Descriptions of parts similar to those described above are omitted.

In Operation Example 2, part of the relay connection is released by releasing the RRC connection between the UE 100 and the eNB 200.

Steps S210A and S210B correspond to steps S110A and 110B.

Thereafter, it is assumed that the RRC connection between the UE 100 and the eNB 200 has been released. The UE 100 is in the RRC idle state.

The connection between the UE 100 and the wUE 150 may be released. The connection between the UE 100 and the wUE 150 may be maintained.

In step S220, the MME 300 that recognizes that data addressed to the wUE 150 exists may transmit a paging message (wUE's information) to the UE 100 when the RRC connection between the UE 100 and the eNB 200 is released. The MME 300 may transmit a paging message to the UE 100 for the purpose of data transmission addressed to the wUE 150, rather than data transmission addressed to the UE 100.

The paging message may be a message for prompting the establishment of the relay connection. The message may be a message for prompting the establishment of the RRC connection between the UE 100 and the eNB 200 in order to establish the relay connection. The message may be a message for prompting the transmission of data addressed to the wUE 150.

When the UE 100 is performing the DRX (Discontinuous reception) operation, the MME 300 may transmit the paging message at the timing based on the DRX cycle of the UE 100. That is, the MME 300 may transmit the paging message at a timing (paging opportunity: PO) at which the UE 100 monitors the paging message.

The MME 300 may transmit a paging message at a predetermined timing. For example, the predetermined timing may be a timing calculated by an identifier (for example, IMSI) of the wUE 150. The UE 100 may monitor the paging message at a predetermined timing even when the UE 100 is performing the DRX operation.

The paging message may include at least one of the following information.

Identifier of the wUE 150 (for example, IMSI, ProSe ID, Destination ID, Destination Index, IP address, MAC address, etc.)

Identifier of the UE 100 (for example, IMSI, ProSe ID, Destination ID, Destination Index, IP address, MAC address, etc.)

An identifier indicating that it is a paging message addressed to the wUE (for example, remoteUEPagingIndication)

The identifier of the wUE 150 and/or the identifier of the UE 100 may be an identifier notified to the network by the Wearable Attach information. A list of the identifier of the wUE 150 may be associated with the identifier of the UE 100. The list is valid when the UE 100 is a relay UE of plurality of wUEs.

UE 100 receives a paging message from the network. The UE 100 may recognize that there is data addressed to the wUE 150 based on the information contained in the paging message. The UE 100 may recognize that there is data addressed to the wUE 150 based on the timing of receiving the paging message.

In step S230, the UE 100 starts control for establishing a connection between the UE 100 and the eNB 200 in response to receiving the paging message.

In step S240, the UE 100 starts control for establishing a connection between the UE 100 and the wUE 150 in response to receiving the paging message.

The UE 100 (re-)establishes a relay connection between the wUE 150 and the network.

The process of step S240 may be started before the process of step S230. The process of step S230 and the process of step S240 may be started at the same time.

Steps S250, S260A, and S260B correspond to steps S140, S150A, and S150B.

Conventionally, when the connection between the UE 100 and the eNB 200 is released, relaying is impossible, so that it is assumed that the relationship between the UE 100 and the wUE 150 stored on the network is discarded. Therefore, even if the data addressed to the wUE 150 arrives at the SGW 400 (or the PGW 500), it was impossible to notify the wUE 150 that the data addressed to the wUE 150 exists.

According to Operation Example 2, even when the connection (RRC connection) between the UE 100 and the eNB 200 is released, the UE 100 starts control for establishing the connection between the UE 100 and the eNB 200 by the paging message from the network. Thus, since the relay connection is (re-)established, the wUE 150 can receive the data.

(C) Operation Example 3

Figure 11:
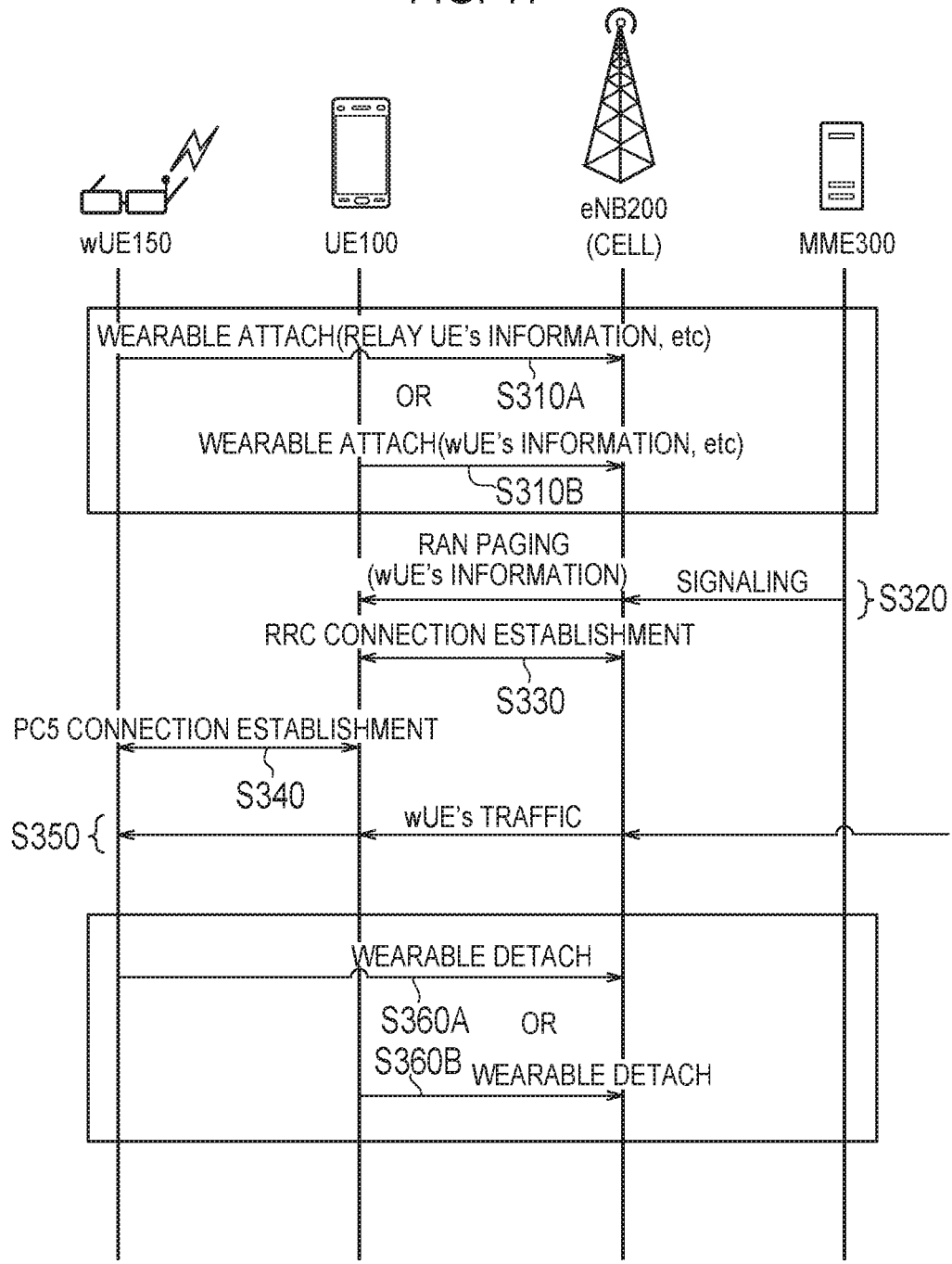
FIG. 11 is a sequence diagram for explaining Operation Example 3.

Operation Example 3 will be described with reference to FIG. 11. FIG. 11 is a sequence diagram for explaining Operation Example 3. Descriptions of parts similar to those described above are omitted.

In Operation Example 3, the eNB 200 transmits, to the UE 100, a message (paging message) indicating that the data addressed to the wUE 150 exists (has arrived).

Steps S310A and S310B correspond to steps S110A and S110B. The wUE 150 may notify the eNB 200 of the Wearable Attach information. The UE 100 may notify the eNB 200 of the Wearable Attach information.

The eNB 200 may receive the Wearable Attach information (or the information indicating the relationship between the relay UE and the remote UE) from the upper network apparatus (for example, the MME 300, the HSS 600, the network apparatus, etc.).

As with the above-described the MME 300, the eNB 200 may store the relationship between the relay UE and the remote UE based on the Wearable Attach information. The eNB 200 may update the information on the relationship between the relay UE and the remote UE.

The eNB 200 may determine to apply the RAN paging to the relay UE based on the Wearable Attach information. RAN paging performs paging in units of predetermined paging areas where paging is controlled by the E-UTRAN 10 (eNB 200). The predetermined paging area is an area narrower than the tracking area. By introducing a predetermined paging area, it is possible to reduce the number of cells that perform paging on one UE 100, so that signaling can be reduced. Hereinafter, such a predetermined paging area will be referred to as a "RAN paging area".

In step S320, the MME 300 that recognizes that data addressed to the wUE 150 exists transmits, to the eNB 200, a signal indicating that data addressed to the wUE 150 exists.

Upon receiving the signal, the eNB 200 transmits a RAN paging message to the UE 100. The eNB 200 transmits a RAN paging message in the same way as the MME 300 described above. The RAN paging message may include information similar to the paging message described above.

Steps S330 to S350 correspond to steps S230 to S250.

Steps S360A and S360B correspond to steps S150A and S150B. The wUE 150 may notify the eNB 200 of the Wearable Detach information. The UE 100 may notify the eNB 200 of the Wearable Detach information. The eNB 200 may receive the Wearable Detach information (or information for deleting (releasing) the relationship between the relay UE and the remote UE) from the upper network apparatus (for example, the MME 300, the HSS 600, the network apparatus, etc.). In response to receiving the Wearable Detach information, the eNB 200 may delete (release) the relationship between the UE 100 and the wUE 150.

(D) Operation Example 4

Figure 12:
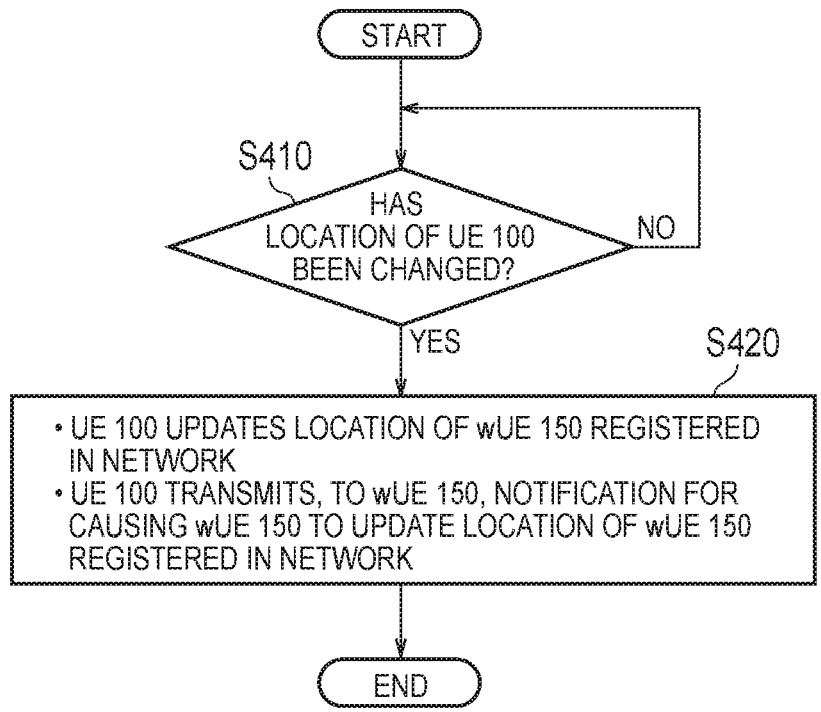
FIG. 12 is a flowchart for explaining the operation of the UE 100 (relay UE).
Figure 13:
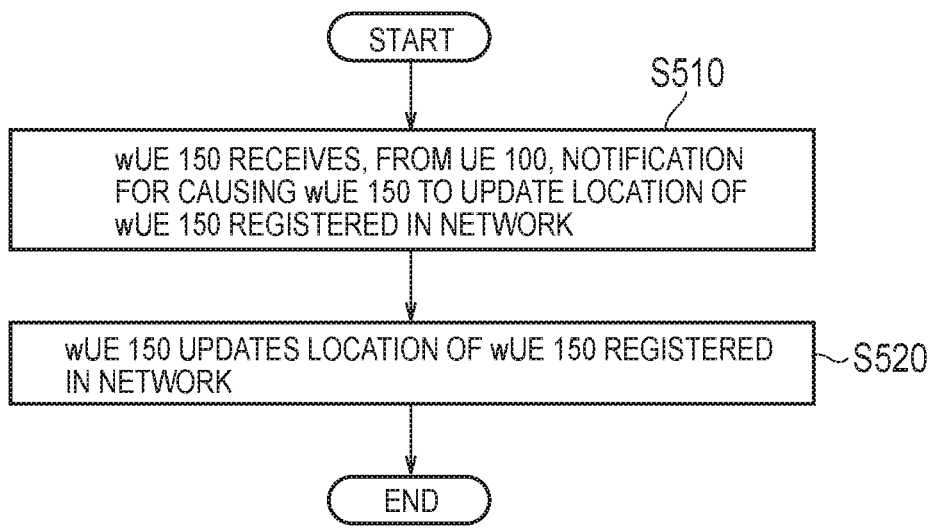
FIG. 13 is a flowchart for explaining the operation of a wUE 150 (remote UE).

Operation Example 4 will be described with reference to FIGS. 12 and 13. FIG. 12 is a flowchart for explaining the operation of the UE 100 (relay UE). FIG. 13 is a flowchart for explaining the operation of the wUE 150 (remote UE). Descriptions of parts similar to those described above are omitted.

In Operation Example 4, it is assumed that the UE 100 transits to the idle state when the relationship between the UE 100 and the wUE 150 is held in the network. The operation for appropriately receiving a message from the network indicating that the data addressed to the wUE 150 exists as described above by the movement of the UE 100 (and the wUE 150) which is in the idle state even when the cell is changed will be described.

As shown in FIG. 12, in step S410, the UE 100 determines whether the location of the UE 100 has been changed. For example, the UE 100 determines whether the location of the UE 100 has been changed by at least one of the following methods.

First, the UE 100 determines that the location of the UE 100 has been updated according to the update of the location of the UE 100 registered in the network. For example, the UE 100 may determine that the location of the UE 100 has been changed, according to a change in the tracking area of the UE 100. The UE 100 may determine that the location of the UE 100 has been changed according to a change in the RAN paging area of the UE 100.

Second, the UE 100 may determine that the location of the UE 100 has been changed according to the selection cell being changed due to the cell (re)selection. The selection cell is a cell (serving cell/primary cell) that provides a (communication) service to the UE 100.

When the UE 100 determines that the location of the UE 100 has been changed, the UE 100 performs the process of step S420. If the UE 100 determines that the location of the UE 100 has not been changed, the UE 100 may end the process.

In step S420, the UE 100 may perform at least one of the following operations in response to a change in the location of the UE 100.

First, the UE 100 may update the location of the wUE 150 registered in the network instead of the wUE 150.

The UE 100 may update the tracking area of the wUE 150 when updating the tracking area of the UE 100. The UE 100 may update the RAN paging area of the wUE 150 when updating the RAN paging area of the UE 100. The UE 100 may include information for updating the area of the wUE 150 in a message for updating its own area. The UE 100 may notify the network of the message.

When updating the location of the wUE 150 registered in the network, the UE 100 may regard the location of the wUE 150 as the location of the UE 100. The eNB 200 may broadcast (for example, by SIB) area information indicating the location (for example, tracking area, RAN paging area, etc.) of the wUE 150 registered in the network. The UE 100 may update the location of the wUE 150 when the area information and the location of the UE 100 are different.

The network apparatus that registers the location of the wUE 150 is, for example, the eNB 200, the PGW 500, the HSS 600, a local gateway (Local GW), or another network apparatus. The network apparatus that registers the location of the wUE 150 may be a network apparatus (node) that manages information (list) on the relationship between the relay UE and the remote UE. The UE 100 may transmit a message for updating the location of the wUE 150 to the network apparatus that registers the location of the wUE 150. In response to the update of the location of the wUE 150, the network apparatus may transmit information indicating the relationship between the UE 100 and the wUE 150 to the network apparatus (for example, the MME 300, the eNB 200, etc.) that transmits a message (paging message) indicating that data addressed to the wUE 150 exists.

Second, the UE 100 may transmit, to the wUE 150, a notification for updating the location of the wUE 150 registered in the network. UE 100 may establish a connection between UE 100 and wUE 150 to transmit the notification. UE 100 may perform an operation for establishing a relay connection.

In step S510 of FIG. 13, the wUE 150 receives, from the UE 100, a notification for causing the wUE 150 to update the location of the wUE 150 registered in the network.

In step S520, the wUE 150 transmits to the network a message for updating the location of the wUE 150 via a relay connection in response to receiving the notification from the UE 100. The network apparatus updates the location of the wUE 150 according to receiving the message.

According to the above description, even when the UE 100 and the wUE 150 has moved, the location of the wUE 150 registered in the network is appropriately updated. Accordingly, since the network recognizes that when the location of the UE 100 and the location of the wUE 150 are moved away, it is possible to suppress a state in which a message indicating that the data addressed to the wUE 150 described above exists is not appropriately transmitted.

OTHER EMBODIMENTS

While the contents of the present application have been described in accordance with the embodiments described above, it should not be understood that the description and drawings constituting part of this disclosure limit the contents of the present application. From this disclosure, various alternative embodiments, examples and operational techniques will be apparent to those skilled in the art.

In the above description, the case where one relay connection is established between the wUE 150 and the network has been mainly explained, but the present invention is not limited thereto. A plurality of relay connections may be established between the wUE 150 and the network. For example, when a relay connection is established for each bearer, a plurality of relay connections may be established between the wUE 150 and the network. When data addressed to the wUE 150 to be transmitted through the relay connection being released among a plurality of relay connections has arrived, the network may transmit, to the UE 100, a message (paging message) indicating that the data addressed to the wUE 150 exists. The message may include identification information (for example, a bearer identifier) for identifying the relay connection being released. UE 100 (and wUE 150) may start an operation for (re-)establishing a released relay connection based on the message.

In the above description, when the SIB (System Information Block) from the eNB 200 is changed, the UE 100 may transmit, to the wUE 150, a notification indicating that the SIB has been changed. The UE 100 may perform an operation for establishing the connection when a connection (for example, PC 5 connection) between the UE 100 and the wUE 150 has not been established. The UE 100 may transmit, to the wUE 150 via the established connection, a notification indicating that the SIB has been changed.

The UE 100 may transmit, to the wUE 150, a notification indicating that the SIB has been changed by a radio signal receivable by the wUE 150 even when a connection (for example, PC 5 connection) between the UE 100 and the wUE 150 is not established. For example, the UE 100 may transmit, to the wUE 150, a notification indicating that the SIB has been changed by the MIB-SL (MasterInformationBlock-SL) carrying the side link common control information.

In the embodiment described above, the wearable UE has been described as an example, but the present invention is not limited thereto. For example, the above contents may be applied to a communication device connected to a network in a mobile (for example, a vehicle) and a UE (or an IoT (Internet of Things) device in a mobile) in the mobile. The above-described contents may be applied to communication devices for machine type communication (MTC), which is communication not involving any person.

The operations according to the above-described embodiments may be combined as appropriate. Not all operations are necessarily indispensable in each of the above-described sequences. For example, only part of the operations may be performed in each sequence.

Although not particularly mentioned in the above embodiment, a program for causing a computer to execute each process performed by any of the above-described nodes (the UE 100, the eNB 200, the NW device, etc.) may be provided. The program may be recorded on a computer readable medium. Use of the computer readable medium makes it possible to install a program in a computer. Here, the computer readable medium on which the program is recorded may be a non-transitory recording medium. The non-transitory recording medium is not particularly limited, but it may be a recording medium such as a CD-ROM or a DVD-ROM, for example.

Alternatively, a chip constituted by a memory for storing a program for executing each process performed by any of the UE 100, the eNB 200, and the NW device and a processor for executing the program stored in the memory may be provided.

In the above-described embodiment, the LTE system has been described as an example of the mobile communication system, but the present invention is not limited to the LTE system, and the contents according to the present application may be applied to a system other than the LTE system.

The invention claimed is:

1. A radio terminal configured to perform a relay between another radio terminal and a network, the radio terminal comprising:
   a transmitter configured to notify the network of first information indicating that the radio terminal is a relay terminal of the another radio terminal;
   a controller configured to forward data addressed to the another radio terminal to the another radio terminal via a connection between the another radio terminal through the radio terminal and the network; and
   a receiver configured to receive, from the network, a message indicating that the data addressed to the another radio terminal exists when at least part of the connection is released;
   wherein the controller is configured to start control for establishing the connection in order to forward the data addressed to the another radio terminal in response to receiving the message, wherein
   the controller is configured to update a location of the another radio terminal registered in the network, instead of the another radio terminal updating the location, according to a change in a location of the radio terminal.

2. The radio terminal according to claim 1, wherein the controller is configured to establish the connection by establishing a connection between the radio terminal and the another radio terminal.

3. The radio terminal according to claim 1, wherein the controller is configured to establish the connection by establishing a connection between the radio terminal and the network.

4. The radio terminal according to claim 1, wherein the receiver is configured to receive a paging message as the message when a connection between the radio terminal and the network is released.

5. The radio terminal according to claim 1, wherein the transmitter is configured to notify the network of second information for deleting from the network that the radio terminal is a relay terminal of the another radio terminal.

6. The radio terminal according to claim 5, wherein the transmitter is configured to notify the network of the second information in response to a determination that a relay to the another radio terminal is unnecessary.

7. The radio terminal according to claim 5, wherein the transmitter is configured to notify the network of the second information in response to a determination that communication with the another radio terminal is impossible.

8. The radio terminal according to claim 1, wherein the controller is configured to determine that the location of the radio terminal has been changed according to an update of a location of the radio terminal registered in the network.

9. The radio terminal according to claim 1, wherein the controller is configured to determine that the location of the radio terminal has been changed according to a change in a selection cell.

10. A radio terminal configured to perform a relay between another radio terminal and a network, the radio terminal comprising:
    a transmitter configured to notify the network of first information indicating that the radio terminal is a relay terminal of the another radio terminal;
    a controller configured to forward data addressed to the another radio terminal to the another radio terminal via a connection between the another radio terminal through the radio terminal and the network; and
    a receiver configured to receive, from the network, a message indicating that the data addressed to the another radio terminal exists when at least part of the connection is released; wherein
    the controller is configured to start control for establishing the connection in order to forward the data addressed to the another radio terminal in response to receiving the message, and
    the transmitter is configured to transmit, to the another radio terminal, a notification for updating a location of the another radio terminal registered in the network according to a change in a location of the radio terminal.

11. The radio terminal according to claim 10, wherein the controller is configured to determine that the location of the radio terminal has been changed according to an update of a location of the radio terminal registered in the network.

12. The radio terminal according to claim 10, wherein the controller is configured to determine that the location of the radio terminal has been changed according to a change in a selection cell.

13. A network apparatus comprising:
    a controller,
    wherein the controller is configured to
    receive first information indicating that a first radio terminal is a relay terminal of a second radio terminal,
    transmit data addressed to the second radio terminal to the second radio terminal via a connection between the second radio terminal through the first radio terminal and the network apparatus, and
    notify the first radio terminal of a message indicating that the data addressed to the second radio terminal exists based on the first information when at least part of the connection is released, wherein
    the controller is configured to update a location of the another radio terminal registered in the network, instead of the another radio terminal updating the location, according to a change in a location of the radio terminal.

* * * * *